Patented Mar. 2, 1937

2,072,530

UNITED STATES PATENT OFFICE 2,072,530

PROCESS FOR THE MANUFACTURE OF CITRATE OF LIME FROM CITRUS FRUITS

Andrea Ricevuto, Palermo, and Alexander Hutcheon Bennett, Messina, Italy

No Drawing. Application May 9, 1936, Serial No. 78,955. In Italy April 30, 1935

4 Claims. (Cl. 260—112)

The usual process for the manufacture of citrate of lime from citrus fruits consists in crushing the fruit (or the pulp of the fruit) in some type of mill and allowing the juice thus separated to run into a tank. The fibrous and mucilaginous residue of the fruit which is still saturated with juice is then submitted to pressure so as to expel as far as possible the juice still contained in it. This press juice is mixed with that obtained from the first crushing and the mixed liquid is neutralized with lime or carbonate of lime, the citric acid present being thus precipitated in the form of citrate of lime.

The residue from the press can be used as fodder for animals or may be employed for the manufacture of pectin.

In a modification of this process the crushing and pressing of the fruit take place in the same machine, this machine being known as a continuous press.

It is well known that in this process a considerable quantity of the acid juice remains absorbed in the residue and cannot be expelled even by powerful presses because the mucilaginous nature of the residue does not lend itself to this treatment, and the extraction of the acid by diffusion or washing requires large volumes of water and yields very dilute solutions which are not suitable for the subsequent precipitation process.

The juice obtained in this manner contains much mucilage and insoluble matter in suspension and if employed directly for the precipitation of citrate the citrate produced contains much impurity and is consequently of a low grade. In order to obtain citrate of the high degree of purity which is desired in the citric acid industry it is necessary to carry out a preliminary purification of the juice, an operation which is attended with considerable difficulty and expense.

The process which is the object of the present invention renders it possible to obtain a more complete extraction of the juice from the residue and at the same time effects a purification of the juice itself so as to yield a clarified liquid from which it is possible to precipitate a clean citrate containing a high percentage of citric acid.

The process is carried out in the following manner:—

The fruit (or, in those cases where the pulp has been previously separated from the peel—the pulp of the fruit) is crushed in any convenient type of mill and the residue is minced, using for this purpose any suitable type of mincing machine. To the mass so obtained is added a small quantity of lime sufficient to neutralize about one fourth part of the acid present. The quantity of lime may be varied within certain limits as long as it is kept below that amount which might give rise to some precipitation of citrate of lime. After a short time the mass which at first is slimy, gelatinizes under the influence of the enzymes present. In the jelly thus formed there takes place after some hours of repose, the phenomenon of syneresis, that is a nearly limpid liquid separates spontaneously from the colloidal mass, leaving this in a spongy state in which it can be readily filtered and washed by any suitable system until completely deprived of its acid.

This residue, on account of its spongy condition can be pressed much more readily and efficiently than is the case with the residue obtained in the process hitherto employed and the press cake can be treated with water and pressed a second time in a manner which is not practicable with the usual type of residue.

The juice separated in the first crushing of the fruit may be mixed with the minced residue before adding the lime and this procedure is advisable if it is desired to prepare citrate of lime from this juice, since in this way the clarification of the juice is at once effected.

The liquid resulting from this process contains the citric acid already partially neutralized by lime and is ready for the precipitation of citrate which is effected by adding the remaining quantity of lime needed for neutralization following the usual system and observing the well known precautions necessary to obtain a product of high quality.

The process can be applied to all the different forms of the by-product industry, that is to say;

1. To the process in which the pulp of the fruit is first separated from the peel, the pulp being used for the expression of juice and the peel for the recovery of the essential oil or for other purposes.

2. To the process in which the whole fruit is treated for the extraction of the essential oil by some form of grating machine and is then crushed for the recovery of the juice.

3. To the process in which the fruit is crushed without previous extraction of the essential oil so that this is obtained mixed with the juice from which it is subsequently separated by centrifugation or distillation.

4. To the residues which remain when the fine juice has been extracted for comestible purposes.

The treatment with lime must be applied in all cases to freshly crushed material, avoiding the development of ferments which may be harmful to the working of the process, and when there is reason to fear the possibility of fermentation the addition of a preservative may be advisable.

The lime is most conveniently employed in the form of the hydrate, but this may be partly or wholly replaced by carbonate or sulphite of lime or by other salt of lime which by its reaction with citric acid increases the pH of the liquid.

The addition of calcium chloride may also facilitate the operation and the subsequent precipitation of the citrate of lime.

We claim:

1. A process for the manufacture of citrate of lime from citrus fruits which consists in mincing the fruit after having crushed them in any suitable manner, adding to the slimy mass thus obtained a quantity of lime sufficient to neutralize about one fourth part of the acid present, leaving the mass to repose until a clear liquid separates spontaneously from the colloidal residue, recovering the liquid still absorbed in this residue after decantation of the liquid separated spontaneously, by pressing, filtering the liquid obtained, precipitating citrate of lime from both these liquids by adding the remaining quantity of lime necessary to complete the neutralization of the acid according to the well known process used for this purpose.

2. A process according to claim 1, in which the juice separated in the preliminary crushing of the fruit is added to the minced residue, the whole mass thus obtained being treated with sufficient lime to neutralize about one fourth part of the acid present, leaving the mass to repose, pressing and washing the mass, filtering the liquid obtained therefrom, and precipitating the citrate of lime from the latter by adding thereto a quantity of lime adapted to neutralize the acid therein contained according to the well known process used for this purpose.

3. A process for the treatment of residues from citrus fruit after the extraction of the juice for comestible purposes, which comprises adding to said residue a quantity of lime sufficient to neutralize about one fourth part of the acid present therein, leaving the mass to repose until a clear liquid spontaneously separates therefrom, pressing and washing the mass, filtering the liquid obtained and precipitating the citrate of lime from said liquid by adding thereto the remaining quantity of lime necessary to neutralize the acid.

4. In the manufacture of citrate of lime from citrus fruit a process for recovering the whole of the acid contained in the mass of the fruit after crushing and mincing, consisting in the addition to this mass of a quantity of lime sufficient to neutralize about one fourth part of the acid present, leaving the mass in repose until a clear liquid separates spontaneously, separating this liquid from the mass and washing and pressing of the mass until the whole of its useful content of acid has been extracted.

ANDREA RICEVUTO.
ALEXANDER HUTCHEON BENNETT.